United States Patent [19]

Rinkewich

[11] Patent Number: 4,605,267
[45] Date of Patent: Aug. 12, 1986

[54] SECURITY CART

[75] Inventor: Isaac Rinkewich, New York, N.Y.

[73] Assignee: M.I.T. Polycart Corp., New York, N.Y.

[21] Appl. No.: 713,171

[22] Filed: Mar. 18, 1985

[51] Int. Cl.⁴ .......................................... A47B 96/00
[52] U.S. Cl. .................................. 312/297; 312/312; 312/290
[58] Field of Search ............... 312/290, 312, 138, 297; 160/266, 273, 291, 293 A

[56] References Cited

U.S. PATENT DOCUMENTS

| | | | |
|---|---|---|---|
| 769,423 | 9/1904 | Wilson | 160/235 |
| 1,573,466 | 2/1926 | Ward | 312/290 |
| 1,918,415 | 7/1933 | Miller | 160/235 |
| 2,182,474 | 12/1939 | Hauf | 312/312 |
| 2,202,358 | 5/1940 | Stone | 312/190 |
| 2,214,993 | 9/1940 | De Witt | 312/295 |
| 2,231,005 | 2/1941 | Gordon | 312/190 |
| 2,767,787 | 10/1956 | Miller | 160/201 |
| 2,872,977 | 2/1959 | Pagliaccetti et al. | 160/235 |
| 3,044,841 | 7/1962 | Hein | 312/138 |
| 3,148,724 | 9/1964 | Chieger et al. | 160/201 |
| 3,251,636 | 5/1966 | Hein | 312/122 |
| 3,489,200 | 1/1970 | Recchione | 160/233 |
| 3,715,148 | 6/1971 | Beals | 312/209 |
| 3,842,891 | 10/1974 | Kinnroth et al. | 160/220 |
| 3,876,268 | 4/1975 | Colver | 312/209 |
| 4,019,793 | 4/1977 | Gerding | 312/209 |
| 4,054,343 | 10/1977 | Heyland | 312/209 |
| 4,093,041 | 6/1978 | Davis et al. | 312/236 |
| 4,171,150 | 10/1979 | Soderlund | 312/107 |
| 4,343,340 | 8/1982 | Paule | 160/232 |
| 4,432,591 | 2/1984 | Rienkewich | 312/297 |

FOREIGN PATENT DOCUMENTS

| | | |
|---|---|---|
| 1128688 | 8/1956 | France . |
| 1282133 | 12/1960 | France . |
| 1421525 | 11/1964 | France . |
| 1427143 | 12/1964 | France . |
| 1530680 | 5/1968 | France . |
| 1336773 | 11/1973 | United Kingdom . |

Primary Examiner—William E. Lyddane
Assistant Examiner—Joseph Falk
Attorney, Agent, or Firm—James & Franklin

[57] ABSTRACT

The front of the enclosed cart body has an access opening. A fixed panel is situated below the opening. A flexible panel is mounted for movement from a lower position aligned with the fixed panel to an upper position aligned with and covering the opening. A wedge-shaped protrusion on the fixed panel retains the movable panel in the upper position. The movable panel is flexed to become arcuate such that the protrusion is bypassed as the panel is moved from the upper position towards the lower position. The movable panel can be locked in the upper position to the top panel. The top panel may be stationary or may pivot to open the top of the enclosure for facilitated access.

10 Claims, 8 Drawing Figures

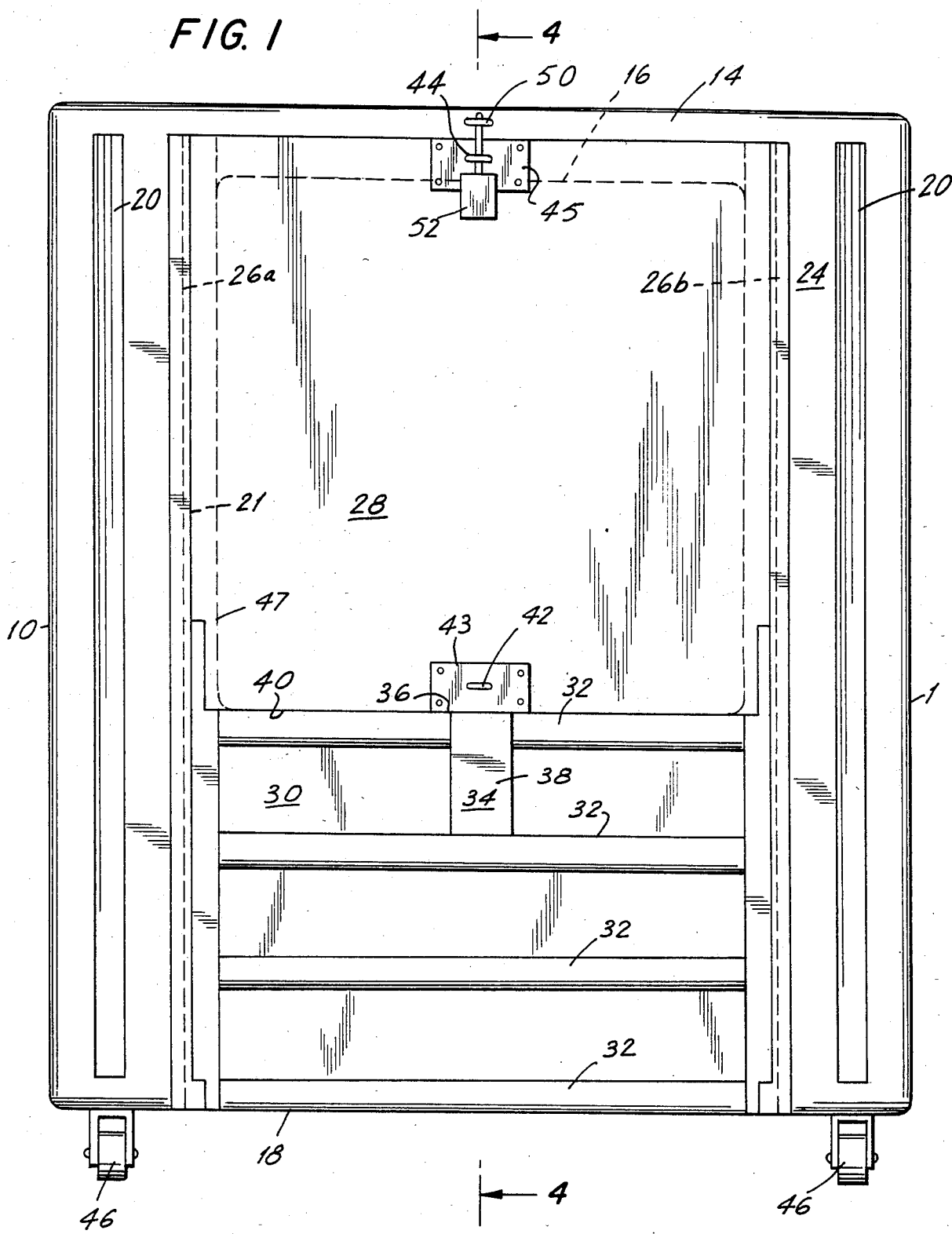

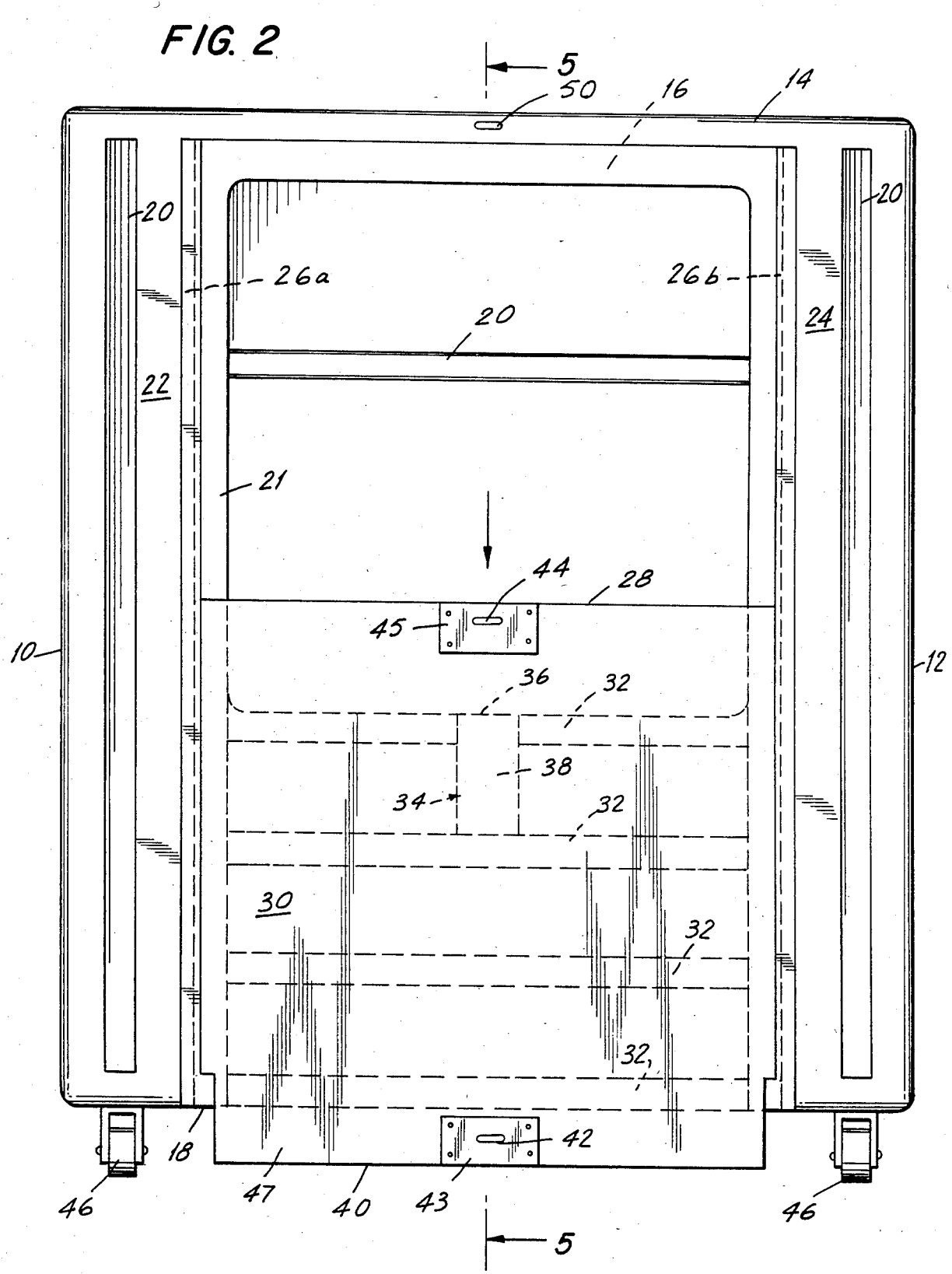

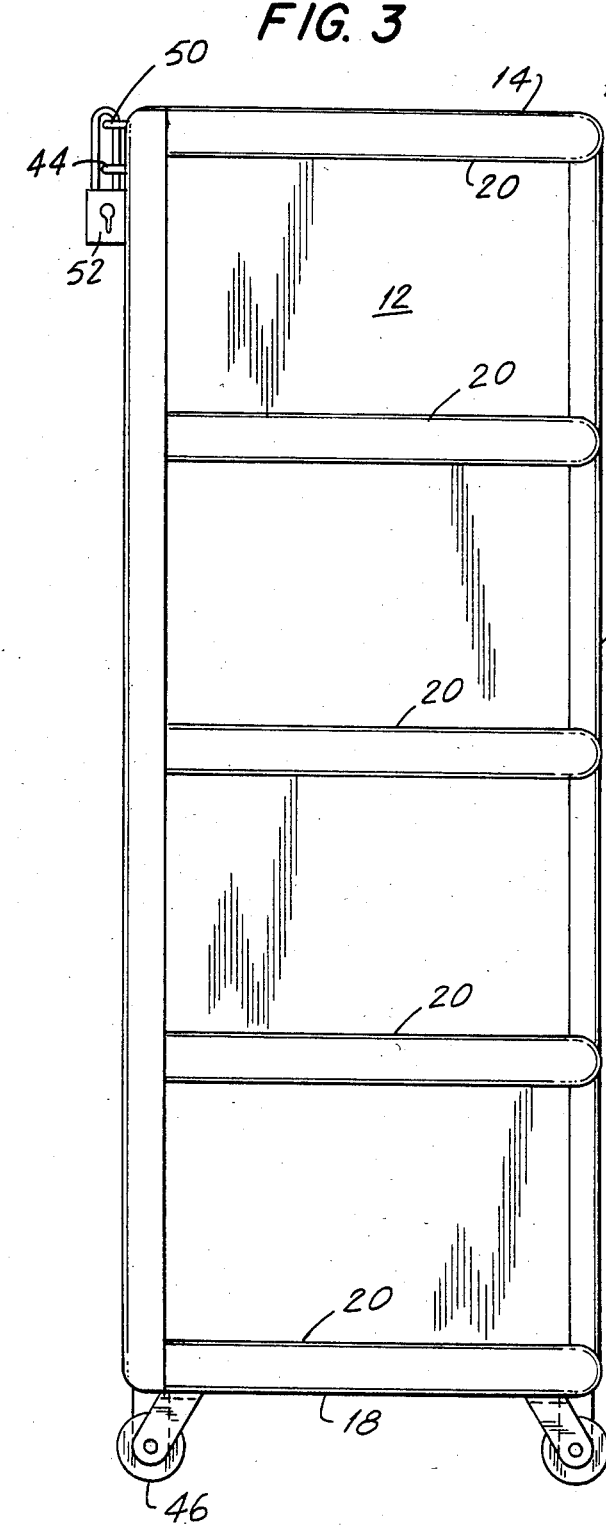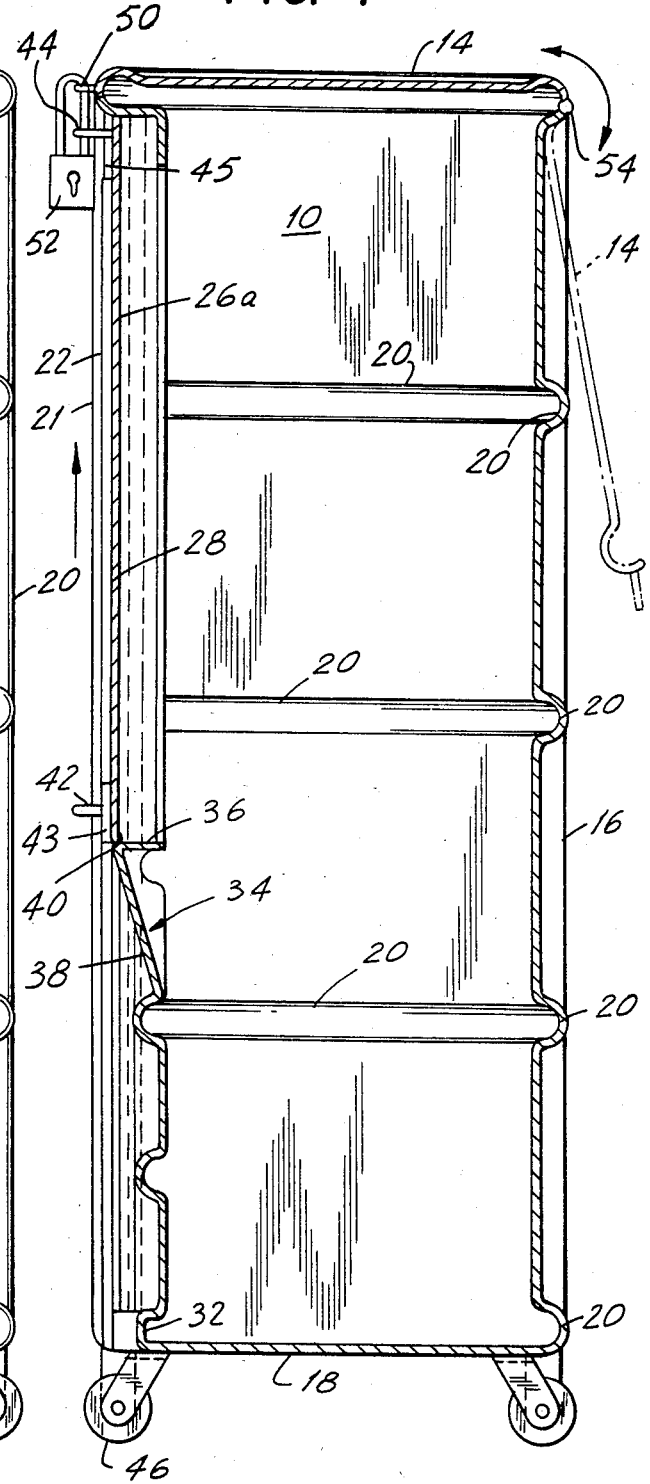

SECURITY CART

The present invention relates to storage and transport carts and, more particularly, to a cart with a unique access system.

Storage and transport carts are used for a wide variety of applications. Hospitals use such carts to store and transport medicine, linen, and other supplies which must be kept sanitary and secure. Restaurants and cafeterias and the like use carts to transfer food products and protect same against dust and other environmental contamination. Department stores use carts to transport garments and other merchandise and secure same against pilferage. Similarly, hotels, motels, and laundries use carts to collect and distribute linens.

Carts designed to perform the above-mentioned tasks normally comprise a molded polymer box-like or a wedge-shaped body which is mounted on wheels or casters to provide mobility. The interior of the cart body may be empty for bulk storage or may be provided with one or more horizontal shelves upon which merchandise can be stored. The body may open, having a non-coverable side or top, or both. Alternatively, the body may be enclosed with a front wall having an opening covered by one or more doors which open outwardly to provide access to the interior of the enclosure. For security purposes, the doors may be locked to protect the items within the enclosure from pilferage.

In one type of cart, such as is described in my U.S. Pat. No. 4,432,591, issued Feb. 21, 1984, and entitled "Storage and Transport Cart With Improved Security", the outwardly opening doors are replaced by a single shutter-type door which slides on tracks located on either side of the opening. The door is composed of a plurality of horizontally extending members which are articulately connected so as to be pivotable, to a limited extent, with respect to each other. Such a shutter-type door has an advantage over the outwardly swinging doors. It is entirely contained within the enclosure when opened. Thus, no additional space surrounding the enclosure need be provided to permit the opening of the door.

From a commercial viewpoint, it is necessary that the cart be as light in weight and as inexpensive as possible. The weight of the cart is important because the lighter the weight, the higher the degree of mobility. In order to keep the weight to a minimum, it is desired that the door be made of light-weight material as well. Further, the light-weight door also facilitates the opening thereof, which requires the lifting of same.

Moreover, it is important that the cart be made of sanitary, waterproof, and washable material. There should be no projections from the cart which interfere with transport or traffic in aisles or corridors. Moreover, the cart should be built to provide years of reliable, maintenance-free service.

In order to achieve these ends, the cart body and the door are preferably made of molded plastic. In order to keep weight to a minimum, the plastic panels can be relatively thin with the necessary ribbing for increased strength and rigidity. Made in this fashion, the cart has no seams, crevices, or joints to catch dirt or snag contents. No nails or screws are required and there are no parts to rust.

In general, the present invention relates to a security cart with all of the advantages described above. However, the shutter-type door of the type described in the above-identified patent has been replaced with a simpler, smaller, and inexpensive door panel which is relatively flexible, but constructed of a single molded part instead of the multiple pivotally connected shutter members previously utilized.

It is, therefore, a prime object of the present invention to provide a security cart with facilitated access to the interior.

It is another object of the present invention to provide a security cart with simplified door panel construction.

It is another object of the present invention to provide a security cart which is relatively light in weight, the simplified construction of the door panel contributing to keep the weight to a minimum.

It is another object of the present invention to provide a security cart capable of providing reliable maintenance-free service.

In accordance with one aspect of the present invention, a security cart is provided comprising an enclosure having a front with an opening to permit access to the interior of the cart. A fixed panel is situated adjacent the opening. A flexible panel is mounted for movement between a first position aligned with the fixed panel and a second position aligned with the opening. Means, located on the fixed panel in alignment with the central portion of the movable panel, are provided for maintaining the movable panel in the second position. The movable panel is capable of being flexed such that the central portion of the movable panel is in a position out of alignment with the position-maintaining means to permit the movable panel to be moved to the first position.

The position maintaining means preferably comprises a wedge-shaped protrusion. The protrusion includes a surface situated substantially perpendicular to the direction of movement of the movable panel. The perpendicular surface is situated to abut the central portion of the edge of the movable panel when same is in the second position.

The protrusion also includes a surface inclined with respect to the direction of movement of the movable panel. The inclined surface causes the movable panel to flex as it is moved from the first position towards the second position, such that it can bypass the position maintaining means.

The cart further preferably comprises means for locking the movable panel in the second position. The locking means comprises an opening in the movable panel, an opening in the enclosure, and a lock including a part passing through the openings.

The enclosure preferably comprises a top panel and wherein the lock receiving opening is situated on the top panel. Preferably, the top panel is mounted for movement between an open position and a closed position.

To these and to such other objects which may hereinafter appear, the present invention relates to a security cart, as described in detail in the following specification and recited in the annexed claims, taken together with the accompanying drawings, wherein like numerals refer to like parts and in which:

FIG. 1 is a front view of the security cart of the present invention with the access opening covered;

FIG. 2 is a front view of the security cart of the present invention showing same with the access opening uncovered;

FIG. 3 is a side view of the security cart of the present invention;

FIG. 4 is a cross-sectional view taken along line 4—4 of FIG. 1;

Figure 6:
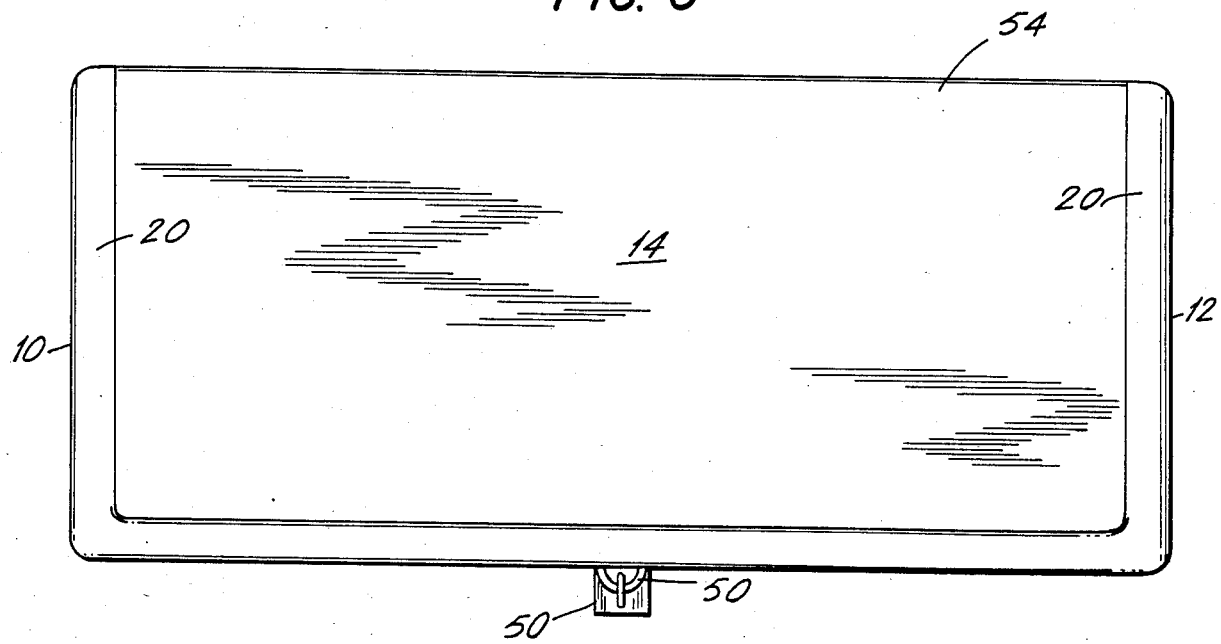
FIG. 6 is a top plan view of the security cart of the present invention.

As seen in FIGS. 1, 3, and 6, the cart of the present invention comprises a substantially box-like body enclosure formed of molded plastic panels. More particularly, the body is defined by side panels 10 and 12, a top panel 14, a rear panel 16, and a bottom panel 18. All of these panels include structural rigidifying ribs 20. The ribs on side panels 10 and 12 extend horizontally and the ribs on rear panel 16 extend both horizontally and vertically.

Figure 7:
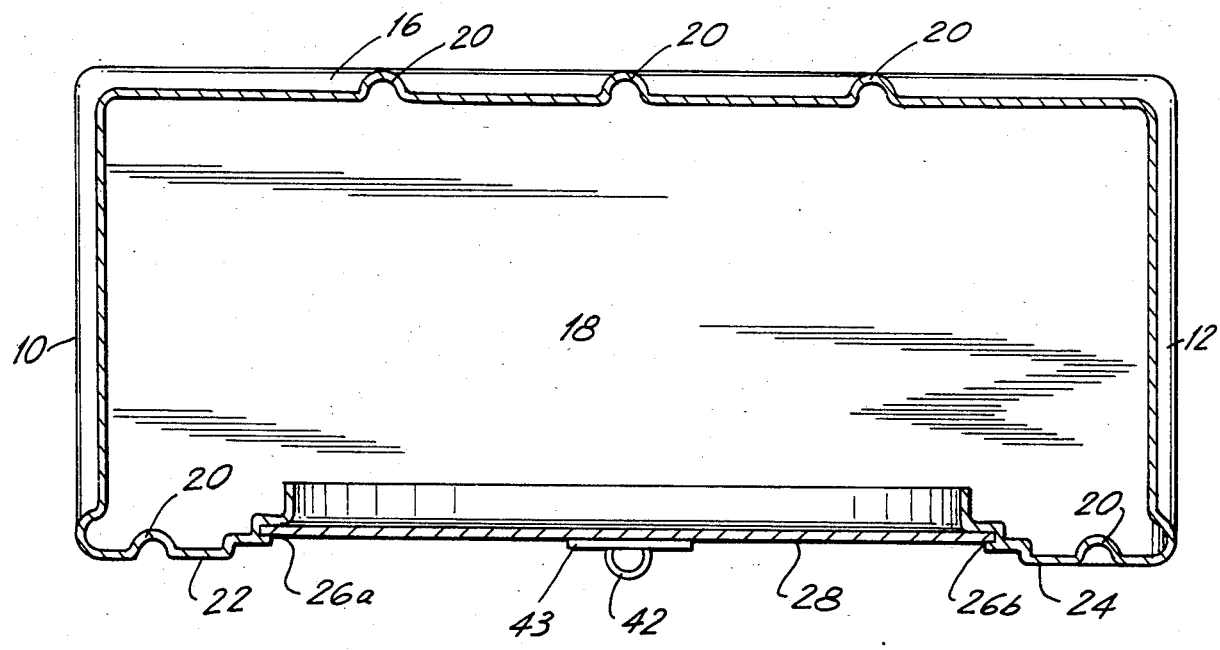
FIG. 7 is a top cross-sectional view taken along line 7—7 of FIG. 1.

The front surface of the cart comprises first and second spaced upright sections 22, 24, the internal structure of which can be best appreciated with reference to FIG. 7.

Figure 5:
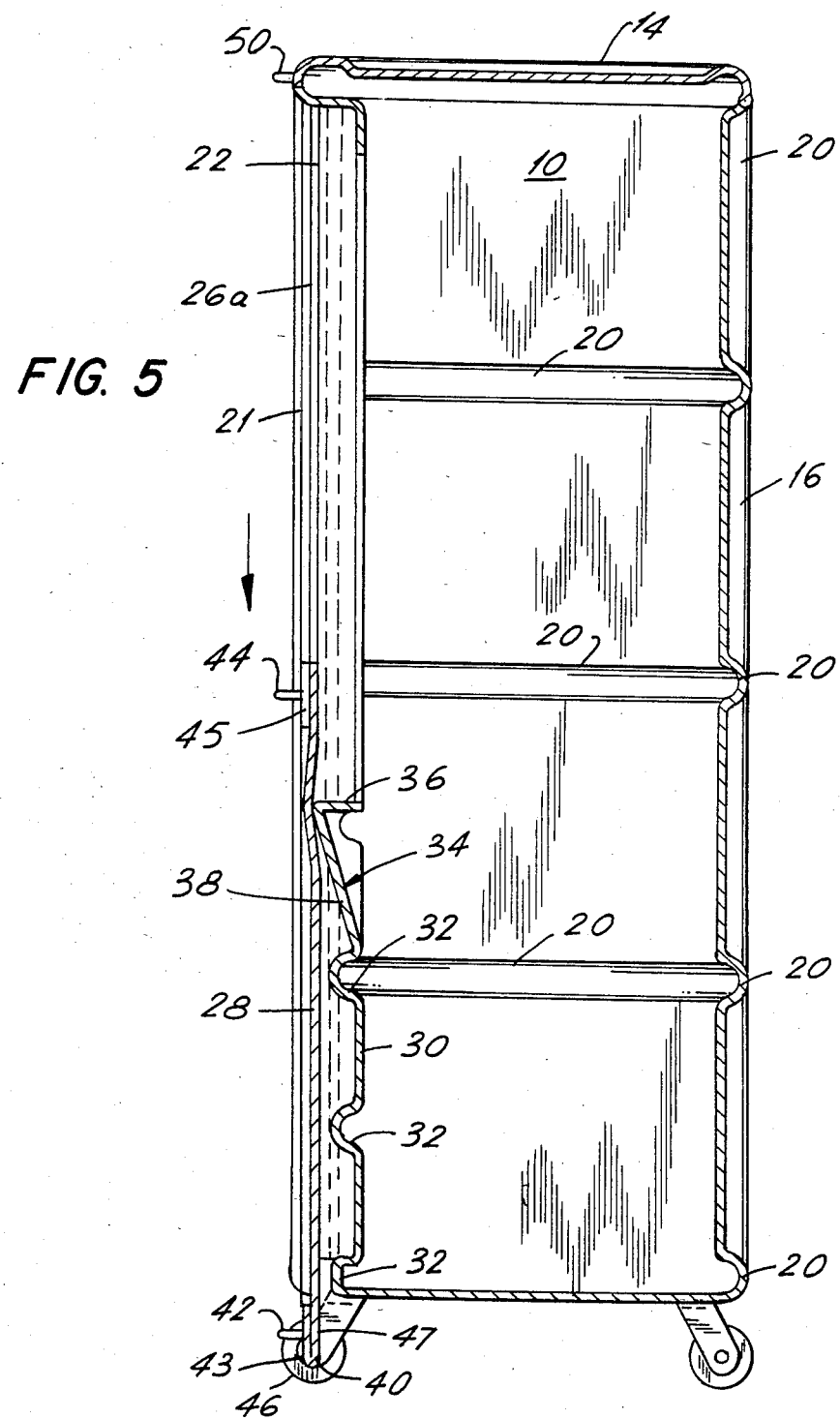
FIG. 5 is a view similar to FIG. 4, but with the access opening uncovered.

FIG. 7 shows that each of the sections 22, 24 is provided with an elongated slot or track 26a, 26b which extends vertically from the top to the bottom thereof. Situated between sections 22 and 24 with its edges in tracks 26a, 26b is movably mounted a door panel 28 made of a single sheet of flexible molded plastic. Door panel 28 is movable within tracks 26a, 26b between an upper position, as shown in FIGS. 1, 4, and 7, and a lower position, as shown in FIGS. 2 and 5.

Extending between sections 22 and 24, at a position behind tracks 26a, 26b and in alignment with the lower position of door panel 28 is a fixed front panel 30. Panel 30 is provided with rigidity enhancing ribs 32 and a central wedge-shaped projection 34.

Projection 34 includes a top surface 36 which extends horizontally, in a direction substantially perpendicular to the direction of movement of door panel 28. It also includes an inclined surface 38 which is inclined with respect to the direction of movement of panel 28 approximately 20°.

Surface 36 of projection 34 intersects the plane of tracks 26 such that when door panel 28 is in the upper position and the door panel is in its normally planar condition, the central portion of the bottom edge 40 of door panel 28 is in alignment with and abuts surface 36 of projection 34. This serves to maintain door panel 28 in its upper position, thereby covering the access opening 21 to the interior of the cart defined between sections 22 and 24, above fixed panel 30 and below top panel 14.

In order to uncover access opening 21, the central portion of the bottom of panel 28 is flexed outwardly such that the bottom of the panel becomes arcuate. In the arcuate condition, the central portion of bottom edge 40 of door panel 28 is no longer in alignment with surface 36 of projection 34 such that door panel 28 can be moved along tracks 26 to its lower position, in front of panel 30.

This is preferably accomplished by a handle 42 mounted on bracket 43 which is situated on the central portion of panel 28 adjacent edge 40 and which permits a convenient grip for this purpose. A second handle 44 is mounted on a bracket 45 and situated near the central portion of the top of panel 28. It is utilized to move panel 28 from its lower position to its upper position.

When moved in this direction, inclined surface 38 of protrusion 34 acts as a camming surface to guide the central portion of panel 28 over projection 34 by causing panel 28 to flex to the arcuate condition. Once the bottom edge 40 of panel 28 clears inclined surface 38, panel 28 will return to its planar condition such that the bottom edge 40 again abuts surface 36 of projection 34 and is maintained in its upper position.

As seen in FIG. 2, which shows the security cart of the present invention with the access opening uncovered, door panel 28 is not completely rectangular, but has recess portions on either side of the bottom section 47 thereof such that the bottom section 47 is a few inches less in width than the remainder of the panel. Preferably, the width of the remainder of panel 28 is slightly smaller than the distance between the inside of tracks 26, whereas the width of the lower section 47 is approximately equal to the width of the access opening 21. Accordingly, when door panel 28 is in the bottom position, as shown in FIGS. 2 and 5, the lower section 47 thereof will extend below the plane of bottom panel 18 into the area between the front casters 46.

For security purposes, it is desirable to permit door panel 28 to be locked in its upper position. This is achieved by providing the top panel 14 with a "U"-shaped member 50 which aligns with the "U"-shaped member of handle 44 when panel 28 is in the upper position. A padlock 52 or the like can be placed through the "U"-shaped members 44, 50 and locked.

In some instances, access to the interior of the cart from the top as well as from the front of the cart is desirable. For that reason, the cart illustrated in FIGS. 1-7 has a pivotal to panel hingeably mounted to rear panel 16 by hinge 54. The front access opening 21 can be uncovered by moving door panel 28 to its lower position and the top of the security cart can be uncovered by pivoting top panel 14 to a position substantially parallel to back panel 16, as shown in phantom in FIG. 4. This provides greatly facilitated access because of the combination of both openings.

Figure 8:
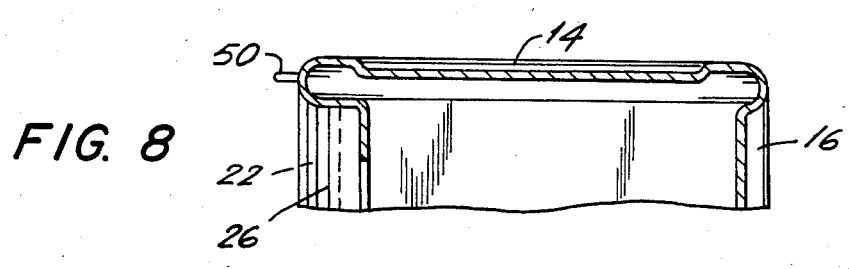
FIG. 8 is a cross-sectional view of the top portion of a second preferred embodiment of the present invention.

Alternatively, a stationary top panel 14' may be provided, as shown in FIG. 8, instead of openable top panel 14. A stationary top panel 14 may be preferable in certain instances where access to the interior of the cart may be limited.

While only two preferred embodiments of the present invention have been disclosed herein for purposes of illustration, it is obvious that many variations and modifications could be made thereto. It is intended to cover all of these variations and modifications which fall within the scope of the present invention, as defined by the following claims:

I claim:

1. A security cart comprising an enclosure having a front with an opening to permit access to the interior of the cart, a fixed panel situated adjacent said opening, a substantially planar flexible panel mounted for movement between a first position aligned with said fixed panel and a second position aligned with said opening, track means along which said movable panel is moved, said track means being situated in a plane spaced from said fixed panel, and means protruding from said fixed panel and intersecting said plane so as to align the central portion of said movable panel and maintain said movable panel in said second position, said movable panel being capable of being flexed such that said central portion is out of alignment with said protruding means to permit said movable panel to be moved from said second position to said first position.

2. The cart of claim 1, wherein said protruding means comprises a wedge-shaped protrusion.

3. The cart of claim 1, further comprising means for locking said movable panel in said second position.

4. The cart of claim 5, wherein said locking means comprises an opening in said movable panel, an opening in said enclosure and a lock comprising a part passing through said openings.

5. The cart of claim 6, wherein said enclosure comprises a top and wherein said enclosure opening is situated on said top.

6. The cart of claim 1, wherein said enclosure has a top panel and further comprising means for movably mounting said top panel for movement between an open position and a closed position.

7. The cart of claim 6, further comprising means for locking said top panel in its closed position with said movable panel in its second position.

8. The cart of claim 1, wherein said central portion of said movable panel has an edge and said protruding means comprises a surface situated substantially perpendicular to the direction of movement of said movable panel, said perpendicular surface being situated to align with and abut said edge of said movable panel when said movable panel is in said second position.

9. The cart of claim 1, wherein said protruding means comprises a surface inclined with respect to the direction of movement of said movable panel, said inclined surface causing said central portion of said movable panel to flex as said movable panel is moved from said first position towards said second position, such that it bypasses said protruding means.

10. A security cart comprising an enclosure having a front with an opening to permit access to the interior of the cart, a top panel mounted to said enclosure for movement between an open position and a closed position, a front fixed panel situated below said opening, a front substantially planar flexible panel having a central portion with an edge and being mounted for movement between a first position aligned with said fixed panel and a second position aligned with said opening, track means along which said flexible panel is moved, said track means being situated in a plane spaced from said fixed panel, a wedge-shaped protrusion on said fixed panel having a surface substantially perpendicular to the direction of movement of said movable panel and situated to align with and abut said edge of said central portion to maintain said movable panel in said second position, and a surface inclined relative to said direction for causing said movable panel to flex as it is moved from said first position towards said second position such that it bypasses said protrusion, and means for locking said movable panel in said second position to said top panel in said closed position.

* * * * *